Aug. 24, 1943.   J. BOLSEY   2,327,860
FILM SCRAPING DEVICE
Filed Oct. 27, 1942   2 Sheets-Sheet 1
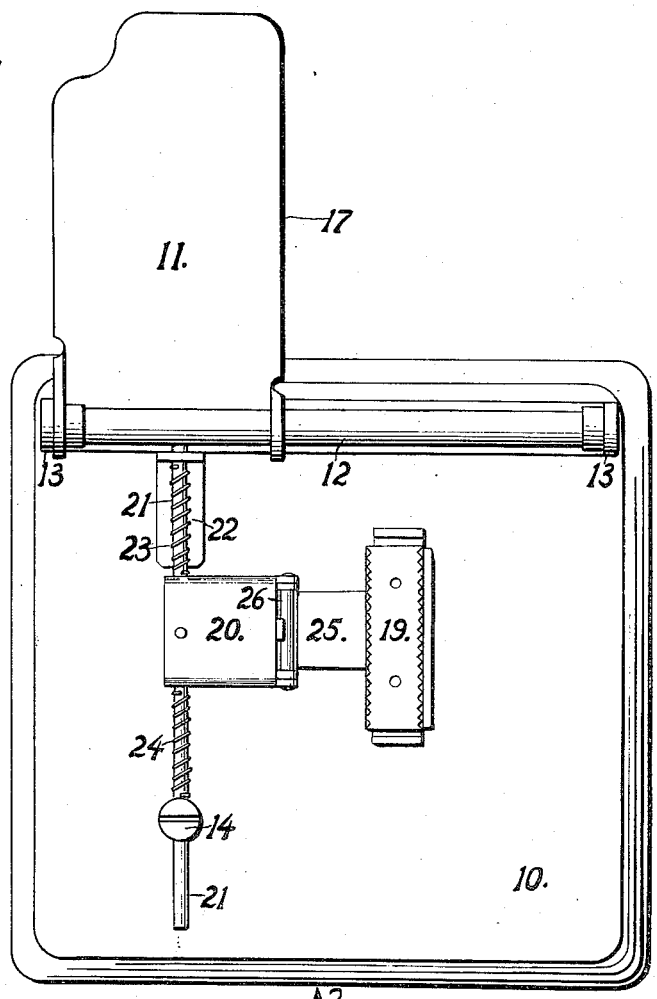
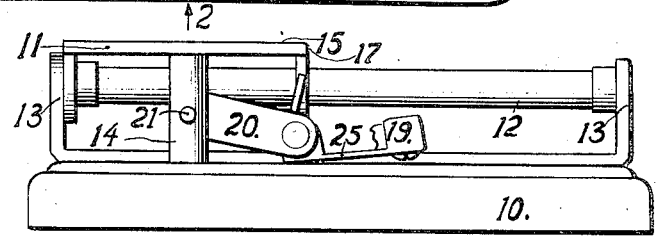
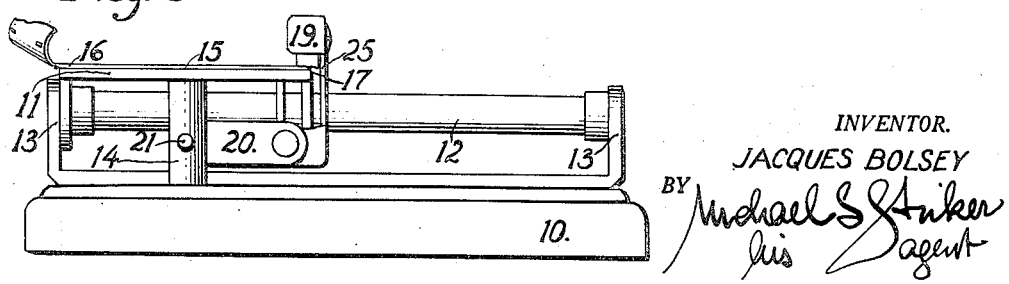
INVENTOR.
JACQUES BOLSEY Aug. 24, 1943.   J. BOLSEY   2,327,860
FILM SCRAPING DEVICE
Filed Oct. 27, 1942   2 Sheets—Sheet 2

INVENTOR.
JACQUES BOLSEY
BY

Patented Aug. 24, 1943

2,327,860

UNITED STATES PATENT OFFICE 2,327,860

FILM SCRAPING DEVICE

Jacques Bolsey, New York, N. Y.

Application October 27, 1942, Serial No. 463,463

6 Claims. (Cl. 154—42)

The present application is a continuation in part of my United States patent application, Ser. No. 331,493, filed April 25, 1940, for "Film splicers."

My present invention relates to film scraping apparatus and more particularly to film scraping apparatus combined with film handling devices as film splicers or the like.

It is an object of my present invention to provide a film scraping apparatus ensuring proper scraping of the emulsion without danger of cutting or otherwise injuring the film base.

It is a further object of my present invention to provide a film scraping device which is handy and can be easily operated by everybody without necessity of acquiring a special skill.

Another object of my present invention consists in a film scraping device which is simple in construction and can easily be combined with other film handling devices and apparatus as for instance film splicers, film cutters or the like.

Still a further object of my present invention consists in a film scraping device which can be combined with other film handling apparatus in such a way that it does not interfere with operation of the latter and nevertheless can be moved into operative position easily and quickly whenever required.

With the above objects in view, the film scraping apparatus comprises a base, a plate supporting the film during scraping, and a cutting device for cutting off the film lying on this plate; in accordance with the present invention, the new scraping apparatus furthermore comprises a scraper head, guiding means for this scraper head enabling its to and fro movement parallel to an edge of the above mentioned supporting plate and at least one hinge member connecting this guiding means and scraper head; this hinge member is positioned during scraping under the plane of that supporting plate and has its axis parallel to the edge plate. This new arrangement enables tilting of the scraper head between inoperative position under the plane of the supporting plate and operative position in contact with the film portion lying on the supporting plate adjacent to the edge of the latter.

In accordance with a preferred embodiment of my invention, the above described film scraping apparatus is combined with a film splicing apparatus provided with a film supporting member having a flat surface supporting the film during splicing. In this case, my scraping device comprises a scraping head adapted to be turned between inoperative position out of contact with the film portion lying on the flat surface of the film supporting member and operative position in contact with this film portion and to be moved in this operative position to and fro parallel to the plane of the film to be scraped; the new device furthermore comprises guiding means for this scraper head enabling its to and fro movement in operative position, and hinge-like means connecting these guiding means and the scraper head so as to enable turning of the latter between inoperative and operative position about an axis parallel to the direction of the to and fro movement of the scraper head; in accordance with the present invention, these hinge-like means are positioned, at least in operative position of the scraper head, under that portion of the flat surface of the film supporting member on which the film portion to be scraped lies during scraping.

The novel features which I consider characteristic for my invention are set forth in particular in the appended claims. The invention itself, however, both as to its construction and its method of operation, together with additional objects and advantages thereof, will be best understood from the following description of specific embodiments, when read in connection with the accompanying drawings in which:

Figure 1 is a top view of a scraping apparatus according to the present invention with the supporting plate in tilted up position and the scraper head in inoperative position;

Figure 2 is a front view of the scraping apparatus shown in Figure 1 with the supporting plate in tilted down position and the scraper head in inoperative position, seen in direction of arrow 2 of Figure 1;

Figure 4:
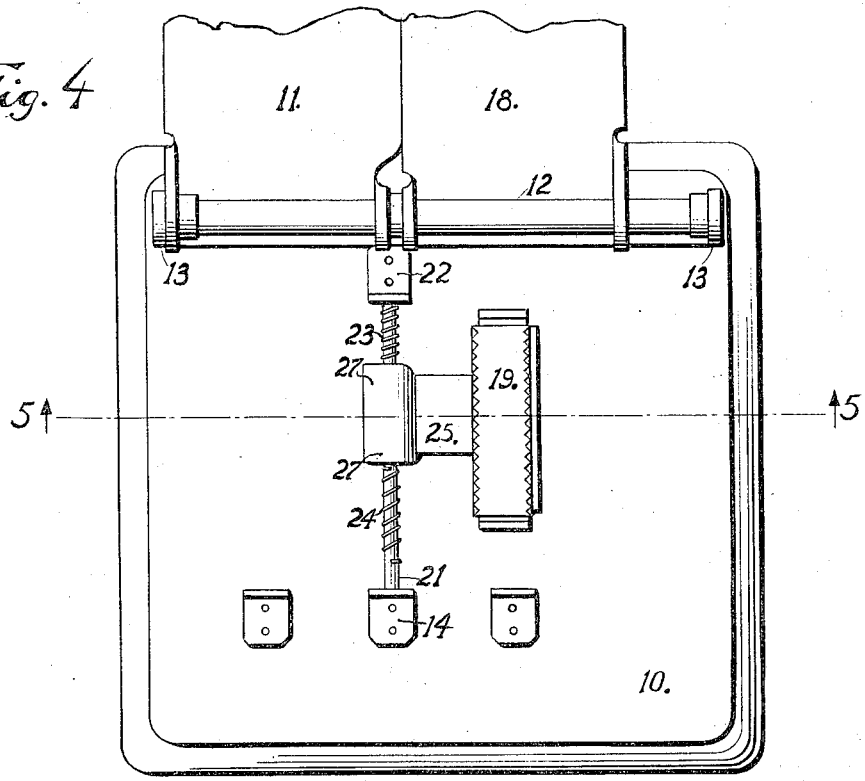
Figure 5:
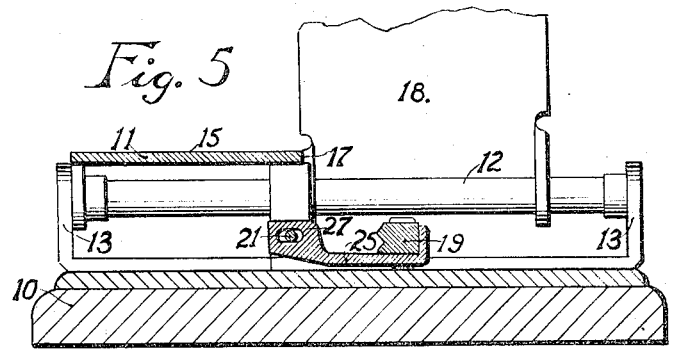
Figure 6:
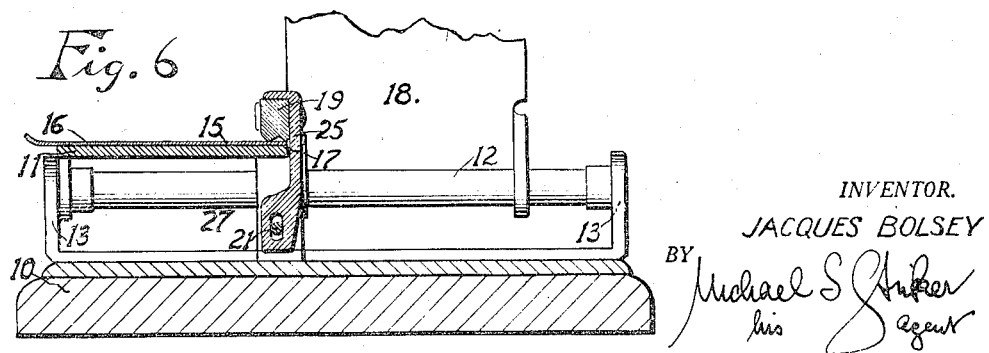

Figure 3 is a front view of the scraping apparatus shown in Figure 2 in operative position; and Figures 4, 5 and 6 are corresponding views of a modification of the scraping apparatus shown in Figures 1 to 3, with the only difference that Figures 5 and 6 show the modified scraping apparatus in section along line 5—5 of Figure 4.

Each of the embodiments of the new film scraping apparatus shown in the drawings comprises a base 10, a film supporting member having a flat surface supporting the film during scraping, and a scraping device. In the embodiments shown in the drawings, the film supporting member consists of a supporting plate 11 hingeably attached to shaft 12; this latter is supported by brackets 13 secured to base 10. The supporting plate 11 is at a certain distance from base 10 and may be either turnable about shaft 12 or stationary. At its front edge plate 11 is supported by a vertical post 14.

This supporting plate 11 may serve only as film supporting member for scraping purposes; it might, however, also be a part of another film handling apparatus, as for instance a film splicer. In this latter case, plate 11 is one of the splicer clamping plates arranged in the usual way and cooperating with other splicer clamping plates which may be hingeably attached to shaft 12 if required.

Plate 11 has an upper supporting surface 15 on which the film strip 16 lies during scraping. This film reaches to edge 17 of the plate.

As shown in Figures 4 to 6, a cutting device 18 of usual type may be combined with plate 11 in such a manner as to be adapted to shear off that portion of the film strip 16 which projects over edge 17.

In other embodiments shown in the drawings the new scraping device comprises a scraper head 19 of usual design, guiding means for this scraper head, and at least one hinge member connecting these guiding means and the scraper head.

In the scraping device shown in Figures 1 to 3, the guilding means consists of a carriage 20 hingeably secured to rod 21 which latter is stationarily secured by means of bracket 22 and post 14 to base 10 at a slight distance therefrom parallel to edge 17 of plate 15. Coil springs 23 and 24 are arranged around rod 21 between carriage 20 and bracket 22 on the one hand and post 14 on the other hand.

To these guiding means the scraper head 19 comprising the scraper holding member 25 is hingedly secured by means of the hinge member 26 connecting carriage 20 with the scraper holder 25. The hinge-like means are positioned at least in operative position of the scraper head under that portion of the supporting surface of plate 15 on which the film portion to be scraped lies during scraping. Preferably, this hinge is arranged substantially under edge 17 ensuring thereby proper scraping of the film. It is evident from the above description that the new scraper arrangement enables tilting of the scraper head 19 between inoperative position under the plane of the supporting plate 15, as shown in Figures 1 and 2, and operative position in contact with the film portion lying on the supporting plate 15 adjacent to cutting edge 17, as shown in Figure 3.

The parts of the simplified scraper embodiment shown in Figures 4 to 6 correspond substantially to those of the embodiment shown in Figures 1 to 3; the only difference between these two embodiments is that in the embodiment shown in Figures 4 to 6 the carriage 20 is omitted and the scraper holder 25 is secured by the hinge member 27 directly to rod 21. Otherwise, construction and operation of this simplified scraping device is the same as that of the device described above in detail.

It will be understood that each of the elements described above, or two or more together, may also find a useful application in other types of film handling apparatus differing from the types described above.

While I have illustrated and described the invention as embodied in film splicing apparatus, I do not intend to be limited to the details shown, since various modifications and structural changes may be made without departing in any way from the spirit of my invention.

Without further analysis, the foregoing will so fully reveal the gist of my invention that others can, by applying current knowledge, readily adapt it for various applications without omitting features that, from the stand point of prior art, fairly constitute essential characteristics of the generic or specific aspects of this invention and therefor such adaptations should and are intended to be comprehended within the meaning and range of equivalence of the following claims

What I claim as new and desire to secure by Letters Patent is:

1. In a film splicing apparatus provided with a film supporting member having a flat surface supporting the film during splicing and scraping, a scraping device comprising a scraper head adapted to be turned between inoperative position out of contact with the film portion lying on the flat surface of said film supporting member and operative position in contact with said film portion and to be moved in said operative position to and fro parallel to the plane of the film, guiding means for said scraper head enabling its to and fro movement in operative position, and hinge-like means connecting said guiding means and said scraper head so as to enable turning of the latter between inoperative and operative position about an axis parallel to the direction of the to and fro movement of said scraper head, said hinge-like means positioned at least in operative position of said scraper head under that portion of the flat surface of said film supporting member on which the film portion to be scraped off lies during scraping.

2. In a film splicing and scraping apparatus, a film supporting member having a flat surface supporting the film during splicing and scraping, said film supporting member having a straight cutting edge bounding said flat supporting surface along which said film is cut off so that the cut-off film to be scraped off reaches to said cutting edge while lying on said supporting surface, a scraper head adapted to be turned about an axis parallel to said cutting edge between inoperative position out of contact with the film portion lying on said flat surface adjacent to said cutting edge and operative position in contact with said film portion and to be moved in said operative position to and fro parallel to said cutting edge, guiding means for said scraper head enabling said to and fro movement, and hinge-like means connecting said guiding means and said scraper head constructed so as to enable turning movement of the latter about said axis parallel to said cutting edge, said hinge-like means positioned at least in operative position of said scraper head substantially under said cutting edge.

3. In a film splicing and scraping apparatus, a base, a plate secured to said base and adapted to support the film during splicing and scraping, said plate having a straight cutting edge so that the film to be scraped off reaches to said cutting edge, a scraper head adapted to be turned between inoperative position out of contact with the film portion lying on said supporting plate adjacent to said cutting edge and operative position in contact with said film portion and to be moved in said operative position to and fro parallel to said cutting edge, guiding means for said scraper head secured to said base and enabling to and fro movement of said scraper head parallel to said cutting edge, and at least one hinge member connecting said guiding means and said scraper head, said hinge member constructed in such a manner as to have its axis of turning under said supporting plate parallel to said cutting edge during scraping.

4. In a film splicing and scraping apparatus, a base, a plate secured to said base and adapted to support the film during splicing and scraping, said plate having a straight cutting edge so that the film to be scraped off reaches to said cutting edge, a scraper head adapted to be turned between inoperative position out of contact with the film portion lying on said supporting plate adjacent to said cutting edge and operative position in contact with said film portion and to be moved in said operative position to and fro parallel to said cutting edge, guiding means for said scraper head secured to said base and enabling to and fro movement of said scraper head parallel to said cutting edge, and at least one hinge-like member connecting said guiding means and said scraper head, said hinge-like member having in operative position of said scraper head its axis of turning positioned under said cutting edge substantially parallel to the same.

5. A film scraping apparatus comprising a base, a plate supporting the film during scraping, said plate having a straight cutting edge, a cutting device for cutting off the film lying on said plate along said cutting edge so that after cutting the film portion to be scraped off is lying on said plate adjacent to said cutting edge, a scraper head, guiding means for said scraper head enabling its to and fro movement parallel to said cutting edge, and at least one hinge member connecting said guiding means and said scraper head, said hinge member positioned during scraping under the plane of said supporting plate and having its axis of turning parallel to said cutting edge, so as to enable tilting of said scraper head between inoperative position under the plane of said supporting plate and operative position in contact with the film portion lying on said supporting plate adjacent to said cutting edge.

6. A film splicing and scraping apparatus comprising a base, a plate supporting the film during splicing and scraping, said plate having a straight cutting edge, a cutting device for cutting off the film lying on said plate along said cutting edge so that after cutting the film portion to be scraped off is lying on said plate adjacent to said cutting edge, a scraper head, guiding means for said scraper head enabling its to and fro movement parallel to said cutting edge, and at least one hinge member connecting said guiding means and said scraper head and constructed so as to be positioned during scraping under said plate and to have its axis of turning positioned substantially under the film portion to be scraped substantially parallel to said cutting edge, so as to enable tilting of said scraper head between inoperative position under the plane of said supporting plate and operative position in contact with the film portion lying on said supporting plate, adjacent to said cutting edge.

JACQUES BOLSEY.